US012768313B2

(12) United States Patent
Zhou et al.

(10) Patent No.: US 12,768,313 B2
(45) Date of Patent: Oct. 20, 2026

(54) CYLINDER HEAD OFFSET CHAMFER DESIGN

(71) Applicant: CUMMINS INC., Columbus, IN (US)

(72) Inventors: Xiling Zhou, Wuhan (CN); Bing Sun, Wuhan (CN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/982,090

(22) Filed: Dec. 16, 2024

(65) Prior Publication Data

US 2025/0116241 A1 Apr. 10, 2025

Related U.S. Application Data

(63) Continuation of application No. PCT/US2023/026090, filed on Jun. 23, 2023.

(30) Foreign Application Priority Data

Jun. 24, 2022 (CN) ......................... 202210728726.1

(51) Int. Cl.
*F02F 1/24* (2006.01)

(52) U.S. Cl.
CPC .......... *F02F 1/24* (2013.01); *F02F 2001/244* (2013.01)

(58) Field of Classification Search
CPC .......... F02F 1/24; F02F 1/42; F02F 2001/244; F01L 3/08; F01L 3/22; F01L 3/06
See application file for complete search history.

(56) References Cited

U.S. PATENT DOCUMENTS

| | | | | |
|---|---|---|---|---|
| 4,223,647 | A | 9/1980 | Castarede | |
| 5,335,634 | A * | 8/1994 | Hashimoto | F02B 23/08 123/193.5 |
| 6,098,590 | A | 8/2000 | Kutschera et al. | |
| 9,719,410 | B2 | 8/2017 | Han | |
| 2013/0333656 | A1 | 12/2013 | Endrigo | |

(Continued)

FOREIGN PATENT DOCUMENTS

| | | | |
|---|---|---|---|
| CH | 664192 | A5 | 2/1988 |
| CN | 107498266 | A | 12/2017 |

(Continued)

OTHER PUBLICATIONS

Machine translation, WO2013023858A1, Bittner et al., obtained from https://worldwide.espacenet.com/, pp. 1-10. 2013.*

(Continued)

*Primary Examiner* — Grant Moubry
(74) *Attorney, Agent, or Firm* — Foley & Lardner LLP

(57) ABSTRACT

The application relates to a cylinder head offset chamfer design. An engine includes a cylinder block and a cylinder head assembly. A plurality of cylinders are defined between the cylinder block and the cylinder head. The cylinder head assembly includes a cylinder head, a plurality of channels defined within the cylinder head, the channels fluidly coupled to the plurality of cylinders via a plurality of cylinder ports. Each of the cylinder ports includes a chamfered portion. The cylinder head assembly further includes a plurality of valves, each of the plurality of valves selectively coupled to a respective cylinder port of the plurality of cylinder ports.

19 Claims, 4 Drawing Sheets

(56) References Cited

U.S. PATENT DOCUMENTS

| | | | | |
|---|---|---|---|---|
| 2015/0345420 | A1* | 12/2015 | Han | F02M 35/1085 123/308 |
| 2015/0354494 | A1* | 12/2015 | Furukawa | F01L 1/26 123/193.5 |
| 2016/0298532 | A1* | 10/2016 | Omura | F01L 3/06 |

FOREIGN PATENT DOCUMENTS

| | | | | | |
|---|---|---|---|---|---|
| EP | 1 493 910 | A1 | | 1/2005 | |
| FR | 2890120 | A3 | | 3/2007 | |
| JP | S58-137804 | A | | 8/1983 | |
| JP | S5964410 | A | | 4/1984 | |
| JP | S59-103809 | A | | 6/1984 | |
| JP | S59-131910 | A | | 7/1984 | |
| JP | S61-140104 | A | | 6/1986 | |
| JP | H0530430 | U | * | 4/1993 | |
| JP | H598972 | A | | 4/1993 | |
| WO | WO-99/42712 | A1 | | 8/1999 | |
| WO | WO-2009062978 | A1 | * | 5/2009 | F01L 3/06 |
| WO | WO-2013023858 | A1 | * | 2/2013 | F02B 31/085 |

OTHER PUBLICATIONS

IPRP for PCT Application No. PCT/US2023/026090, dated Jan. 2, 2025.

International Search Report and Written Opinion for PCT Application No. PCT/US2023/0260906, dated Oct. 12, 2023.

Office Action for CN Application No. 202210728726.1, dated Nov. 28, 2025.

* cited by examiner

CYLINDER HEAD OFFSET CHAMFER DESIGN

CROSS-REFERENCE TO RELATED PATENT APPLICATION

The present application is a continuation of PCT Application No. PCT/US2023/026090, filed Jun. 23, 2023, which claims priority to Chinese Patent Application No. 202210728726.1, filed Jun. 24, 2022. The contents of these applications are incorporated herein by reference.

TECHNICAL FIELD

The present disclosure relates generally to cylinder heads in engine blocks of internal combustion engines.

BACKGROUND

Internal combustion engines include cylinder heads that define channels that carry intake and exhaust gases to and from the cylinders. Valves are used to selectively open and close the channels to the cylinders and are guided into position along valve guide bores. Uneven forces on the valve (from gases entering and/or exiting the cylinders) can result in the valve rubbing against the valve guide bore. Repeated rubbing on the valve guide bore may result in wear on the valve guide bore. Significant guide bore wear may result in a faulty seal or valve knock, both of which may require costly repair or even replacement of the cylinder head to mitigate. A current method of reducing valve guide wear include installing an independent guide. However, this introduces additional parts in the engine assembly and impacts manufacturing assembly.

SUMMARY

One set of embodiments relates an engine comprising a cylinder block and a cylinder head assembly, wherein a plurality of cylinders are defined between the cylinder block and the cylinder head. The cylinder head assembly includes a cylinder head and a plurality of channels defined within the cylinder head, the channels fluidly coupled to the plurality of cylinders via a plurality of cylinder ports, wherein each of the cylinder ports includes a chamfered portion. The cylinder head assembly further includes a plurality of valves, each of the plurality of valves selectively coupled to a respective cylinder port of the plurality of cylinder ports.

Another set of embodiments relates to an engine comprising a cylinder block defining a plurality of cylinders and a cylinder head assembly comprising: a cylinder head; a plurality of channels defined within the cylinder head, the plurality of channels fluidly coupled to the plurality of cylinders via a plurality of cylinder ports, wherein each of the plurality of cylinder ports comprises a chamfered portion; and a plurality of valves, each of the plurality of valves selectively coupled to a respective cylinder port of the plurality of cylinder ports.

In some embodiments, the engine further comprises an exhaust system fluidly coupled to the plurality of channels.

In some embodiments, the chamfered portion defines a central chamfer axis, the central chamfer axis corresponding to an axis along which a respective valve of the plurality of valves operates.

In some embodiments, each valve of the plurality of valves comprises: a valve stem; and a valve head, the valve head contiguous with the valve stem, wherein a corresponding chamfered portion accepts the valve head.

In some embodiments, the chamfered portion corresponds to the shape of a valve head of the valve associated with a respective cylinder port of the plurality of cylinder ports.

In some embodiments, each of the plurality of valves forms a seal with the chamfered portion associated with a respective cylinder port of the plurality of cylinder ports.

In some embodiments, the chamfered portion of each of the cylinder ports is angled away from a corresponding channel of the plurality of channels.

In some embodiments, the chamfered portion of a first cylinder port of the plurality of cylinder ports defines a first shape, and a second cylinder port of the plurality of cylinder ports defines a second shape, wherein the first shape is different than the second shape.

Another set of embodiments relates to a cylinder head assembly of an engine including a cylinder head, a plurality of channels defined within the cylinder head, and a plurality of cylinder ports fluidly coupled to the plurality of channels. The plurality of cylinder ports include a chamfered portion.

Another set of embodiments relates to a cylinder head assembly of an engine, the cylinder head assembly comprising: a cylinder head; a plurality of channels defined within the cylinder head; and a plurality of cylinder ports fluidly coupled to the plurality of channels, each of the plurality of cylinder ports comprising a chamfered portion.

In some embodiments, the cylinder head assembly further defines a plurality of valve guide bores, wherein each of the plurality of valve guide bores defines a guide bore axis.

In some embodiments, a central chamfer axis defined by each of the chamfered portions is co-axial to the guide bore axis of a respective valve guide bore of the plurality of valve guide bores.

In some embodiments, the central chamfer axis is offset from a central channel axis by an offset distance, the central channel axis defined by a respective channel of the plurality of channels.

In some embodiments, the offset distance is approximately 1.3 millimeters.

In some embodiments, the central chamfer axis is offset from a respective channel of the plurality of channels by an offset angle.

In some embodiments, the offset angle is approximately 45 degrees.

In some embodiments, a height of the chamfered portion increases from a minimum height to a maximum height along the edges of the chamfered portion.

In some embodiments, the chamfered portion protrudes away from a central channel axis of a respective channel of the plurality of channels, the chamfered portion protruding farther away from the central channel axis at the maximum height than at the minimum height.

In some embodiments, the chamfered portion tapers along a height from a first width to a second width.

In some embodiments, the second width is greater than the first width. In some embodiments, the plurality of cylinder ports are formed within the cylinder head.

This summary is illustrative only and is not intended to be in any way limiting.

DESCRIPTION OF THE FIGURES

The disclosure will become more fully understood from the following detailed description, taken in conjunction with the accompanying figures, wherein like reference numerals refer to like elements, in which.

DETAILED DESCRIPTION OF EMBODIMENTS

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. Examples of specific implementations and applications are provided primarily for illustrative purposes.

Implementations herein relate to a system for reducing wear in a valve guide bore in a cylinder head of an internal combustion engine. In some embodiments, the cylinder head of the internal combustion engine includes an offset chamfer (e.g., countersink, fillet, etc.) in intake and/or exhaust channels leading away from a plurality of cylinders (e.g., combustion chambers). The offset chamfer is configured to decrease the wear on the valve guide bore by directing flow around the valve in a specific manner and thus reducing the imbalance of forces on the valve. Each combustion chamber has at least one valve and a channel corresponding to the valve. In some embodiments, each channel includes its own system for directing flow. In some embodiments, each offset chamfer is designed specifically for the portion of the cylinder head in which it is situated.

As used herein, the term "flow" refers to intake gases (e.g., air, fuel, recirculated exhaust gases, etc.) and/or exhaust gases (e.g., carbon dioxide, uncombusted hydrocarbons, etc.) that may enter or exit a combustion chamber of an engine. The flow may impart fluid forces on the valves when moving into and out of the cylinders.

Figure 1:
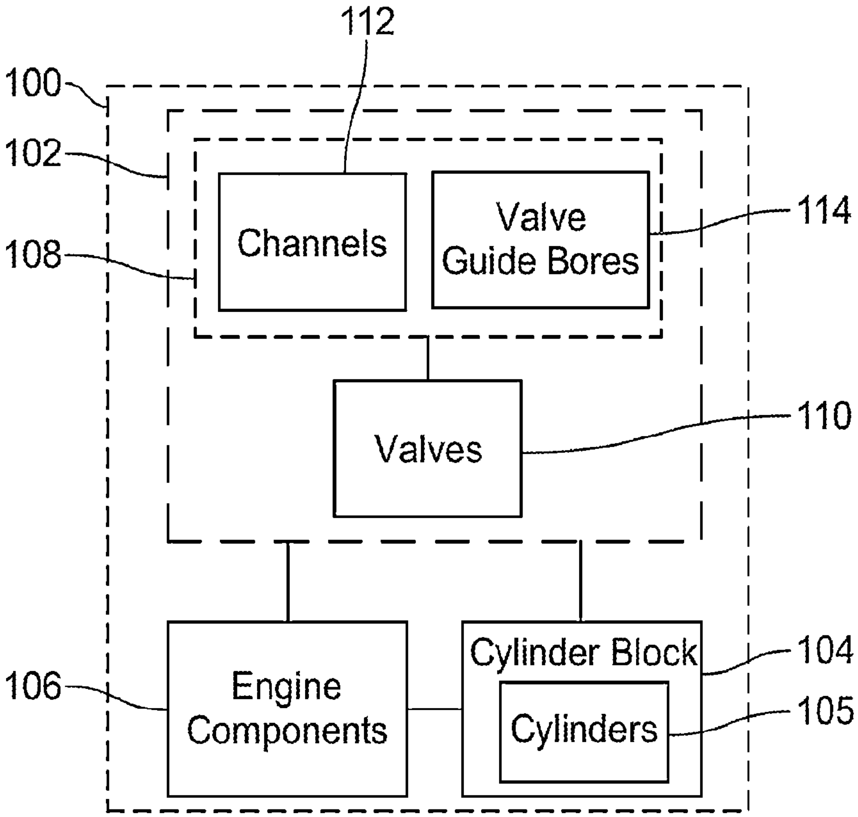
FIG. 1 is a block diagram of an engine, according to an exemplary embodiment.

FIG. 1 is a block diagram of an engine 100, according to an exemplary embodiment. The engine 100 may be used in an engine system (e.g., system utilizing an internal combustion engine for power generation). In some embodiments, the engine 100 may be a gas engine (e.g., engine using gasoline as fuel) or a diesel engine (e.g., engine using diesel as fuel). In some embodiments, the engine 100 may utilize natural gas (e.g., compressed natural gas, liquefied natural gas, etc.) as a source of fuel. In some embodiments, the engine 100 may use more than one type of fuel (e.g., bi-fuel engine, etc.). The engine 100 may be included on a vehicle, such as a car, truck, boat, or the like. In some embodiments, the engine 100 is included in a stationary engine system (e.g., generator, pump, etc.).

The engine 100 includes a cylinder head assembly 102 coupled to a cylinder block 104. In some embodiments, a head gasket may be interposed between the cylinder head assembly 102 and the cylinder block 104. A plurality of cylinders 105 (e.g., space in which combustion occurs) are defined within the cylinder block 104. The engine 100 may include any number (e.g., 1, 2, 3, 4, 5, 6, 7, 8, 9, 10, 11, 12, 13, etc.) of cylinders 105 arranged in an engine configuration (e.g., inline engine, V engine, flat engine, W engine, etc.). For example, the engine 100 may be in a straight-6 configuration, wherein the straight-6 engine has six cylinders 105 arranged in one row. The engine 100 may be any size displacement (e.g., 1 L, 1.5 L, 2 L, 2.5 L, 3 L, 3.5 L, 4 L, 4.5 L, 5 L, 6 L, 7 L, 8 L, etc.). The cylinder head assembly 102 and the cylinder block 104 are further coupled to additional engine components 106. The additional engine components 106 are components configured for the engine 100 function (e.g., exhaust system, fuel injector, intake manifold, filters, camshaft, etc.) and/or components configured to deliver or convert the power generated by the engine 100 (e.g., alternator, driveshaft, etc.).

The cylinder head assembly 102 includes a cylinder head 108 operably coupled with a plurality of valves 110. In some embodiments, the cylinder head assembly 102 only includes a cylinder head 108. The valves 110 selectively allow or restrict flow into/out of the cylinders 105 and into/out of a plurality of channels 112. The channels 112 may take the form of generally tubular spaces defined within the cylinder head 108. The channels 112 fluidly couple the cylinders 105 to an intake system (e.g., filter, carburetor, etc.) and/or exhaust system (e.g., catalytic converter, exhaust gas recirculation system, etc.) of the engine 100. The cylinder head 108 defines a plurality of valve guide bores 114 that guide the valves 110 between an open position (e.g., flow may enter and/or exit the cylinder 104 through the channels 112) and a closed position (e.g., flow is blocked from entering and/or exiting the cylinder 104 through the channel 112). The valve guide bores 114 guide the valves 110 into a predetermined position in the cylinder head 108. Deviation from the predetermined position, such as might result from valve guide bore 114 wear, may result in engine knock, a faulty seal, or other operational issues. In some embodiments, the valve guide bores 114 may be lubricated with a lubricant (e.g., graphite, oil, silicone, etc.). In some embodiments the valve guide bores 114 may include an inner sleeve of a different material than the valve guide bore 114.

Figure 2:
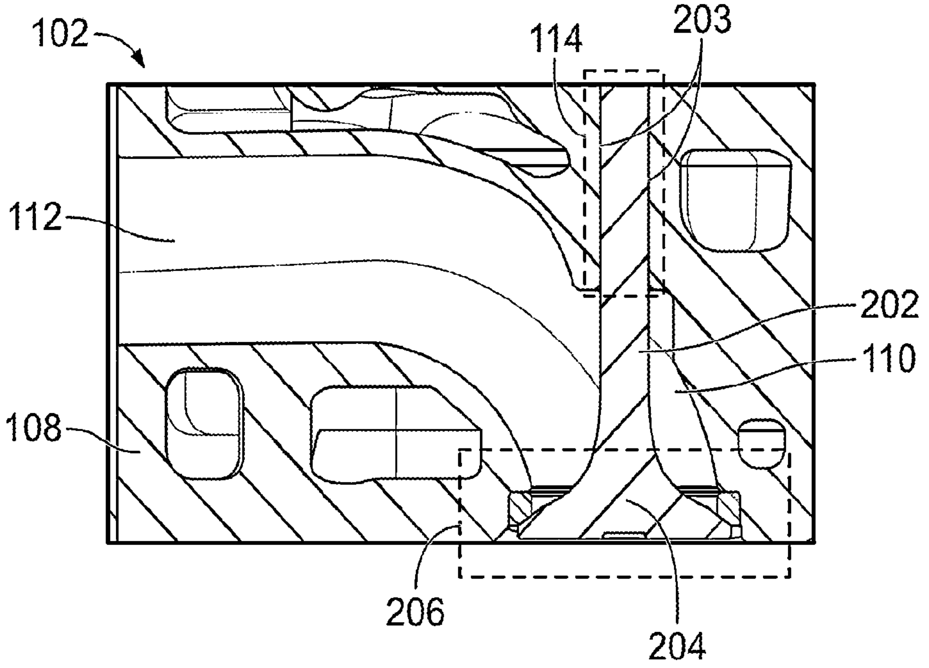
FIG. 2 is as sectional view of a portion of a cylinder head and a valve, according to an exemplary embodiment.

FIG. 2 is a sectional view of a portion of the cylinder head 108 and one valve 110, according to an exemplary embodiment. The valve 110 includes a valve stem 202 coupled to a valve head 204. The valve stem 202 is a cylindrical portion of the valve 110 that slides through the valve guide bore 114 while the valve is operated between an open position and a closed position. While the valve 110 is in an open position, flow entering and/or exiting the cylinder 104 may push the valve stem 202 against an internal walls 203 of the valve guide bore 114. This force may result in the valve stem 202 rubbing against the internal walls 203 of the valve guide bore 114, producing wear on and widening the valve guide bore 114. Wear on the valve guide bore 114 may result in the valve guide bore 114 misdirecting the valve 110 during operation. This misdirection may result in engine knock (e.g., knocking sound produced by engine), a faulty valve seal, or other issues that may affect engine 100 performance.

The valve head 204 is contiguous with the valve stem 202. The valve head 204 includes a filleted portion that strengthens the transition between the valve head 204 and the valve stem 202. The valve head 204 is a circular disk-shaped component that corresponds, in shape, to a cylinder port 206 of the cylinder head 108. The cylinder port 206 is defined as an opening in the cylinder head 108 and is the portion of the cylinder head 108 that fluidly couples the cylinder with the channels 112. The cylinder port 206 is configured to direct flow around the valve 110 when the valve 110 is in an open position. The valve 110 selectively couples to a respective cylinder port 206. The cylinder port 206 is also configured to form a seal with the valve head 204 when the valve 110 is in a closed position, thus preventing from cylinder contents from entering the channels 112. The shape of the cylinder port 206 generally corresponds to the shape of the valve 110. For example, the cylinder port is circular when the valve 110 is circular. The corresponding shape allows the cylinder port 206 and the valve 110 to form a seal when the valve 110 is in a closed position. Variations in the shape of the cylinder port 206 affect how gases flow around the valve 110 when the valve 110 is in an open position, thus affecting the forces on the valve 110. In some embodiments, the cylinder port 206 includes features (e.g., fins, chamfers, fillets, etc.) that reduce vortices, recirculation, or other flow aspects during operation. In some embodiments, the cylinder port 206 and the valve head 204 may be circular, oval, or polygon (e.g., 3-sided, 4-sided, 5-sided, 6-sided, 7-sided, 8-sided, 9-sided, etc.) shaped. In some embodiments, the shape of the cylinder port 206 and the valve head 204 may be irregular (e.g., not a rectangle, square, circle, etc.) and may be specifically designed to direct flow around the valve.

Figure 3:
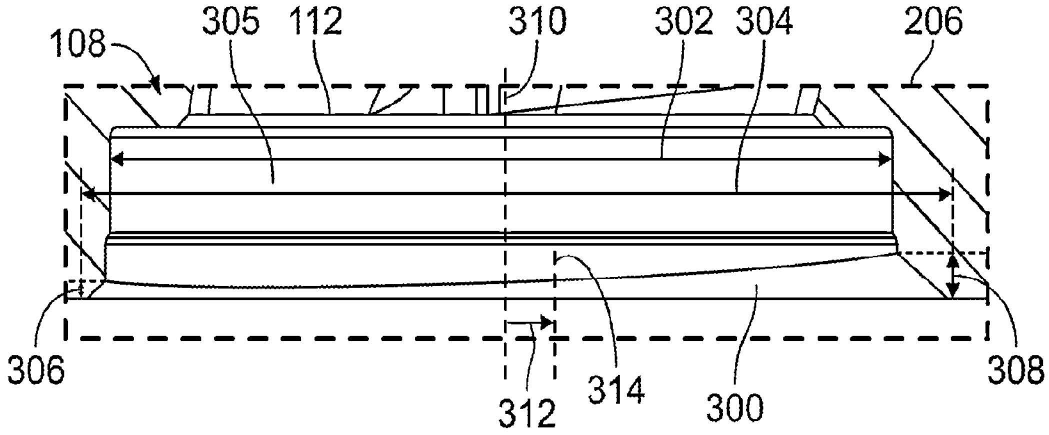
FIG. 3 is a sectional view of a cylinder port, according to an exemplary embodiment.

FIG. 3 is a sectional view of a cylinder port 206, according to an exemplary embodiment. The cylinder port 206 is configured to reduce the net forces on the valve 110, which in-turn reduces the wear on the valve guide bore 114. The cylinder port 206 includes a chamfered portion 300 configured to accept the valve head 204. The chamfered portion 300 tapers along the height from a first width 302 to a second width 304. The first width 302 and the second width 304 are sized to accept the valve head 204 when the valve 110 is in the closed position, thus forming a seal. In some embodiments, the second width 304 is greater than the first width 302. In some embodiments, the cylinder port 206 may include additional sections with varying widths. The chamfered portion 300 may taper from width to width. For example, the chamfered portion 300 may taper from the first width 302 to the second width 304, then to a third width, then to a fourth width. In some embodiments, the cylinder port 206 includes an intermediate area 305 between the chamfered portion 300 and the channel 112. The intermediate area 305 is first width 302 wide. The width of the intermediate area 305 may be smaller, equal to, or larger than the width of the channel 112. The intermediate area 305 may include features to direct, or otherwise affect, the flow.

The shape (e.g., chamfer angle, taper, etc.) of the chamfered portion 300 corresponds to the shape of the valve head 204. In some embodiments, the chamfered portion 300 may include a gasket, or similar feature, to provide a tighter seal. The height of the chamfered portion 300, defined by the vertical height from the beginning of the chamfer to the end of the chamfer, varies along the edges of the cylinder port 206. The chamfered portion 300 includes a minimum height 306 and a maximum height 308. In some embodiments, the minimum height is opposite (e.g., 180 degrees away from) the maximum height 308. The height of the chamfered portion 300 increases from the minimum height 306 to the maximum height 308 along the edges of the chamfered portion 300. In some embodiments, the slope (e.g., change in height) of the chamfered portion 300 may be linear (e.g., along a straight line), exponential (e.g., along an exponential line), or the like. In some embodiments, the slope may be constant (e.g., following one pattern) or may be irregular, wherein different areas of the chamfered portion 300 follow different patterns. For example, a first portion of the chamfered portion 300 may follow a linear slope, while another portion of the chamfered portion 300 may follow an exponential slope.

The chamfered portion 300 changes how flow may enter/exit the cylinder when compared to a cylinder port without a chamfered portion 300. The chamfered portion 300 allows for more flow to enter through areas of the chamfered portion 300 with a greater height, such as at the maximum height 308. The chamfered portion 300 is designed to minimize the net forces on the valve 110 by directing how the flow moves around the valve 110. In some embodiments, the edges of the chamfered portion 300 are rounded (e.g., filleted, etc.) or sharp, such as in a countersink. In some embodiments, the edges of the chamfered portion 300 may have areas that are rounded and areas that are sharp. Rounded edges may be included to increase air flow around certain portions The chamfered portion 300 protrudes further from a channel central axis 310 at the position corresponding to the maximum height 308 than at the minimum height 306. The channel central axis 310 corresponds to a central axis of the channel 112 at the first width 302. Similar to the height of the chamfered portion 300, the extension of the chamfered portion 300 defines a slope. The slope may be constant or irregular, where different areas of the protruding chamfer portion 300 follow different patterns. The difference in chamfered portion 300 width between the minimum height 306 and the maximum height 308 defines an offset 312. The offset 312 is measured between the channel central axis 310 and a chamfer axis 314. The chamfer axis 314 is defined as an axis that is equidistant to each point along the edge of the chamfered portion 300. In some embodiments, the chamfer axis 314 corresponds to the axis along which the valve 110 operably travels and/or to a central axis of the valve guide bore 114. The offset 312 further changes how flow may enter/exit the cylinder. The offset 312 is configured for the portions of the cylinder port 206, such as at the maximum height 308, to allow a more flow to pass through. In some embodiments, the offset distance defined by the offset 312 is approximately 1.3 mm. In some embodiments, the offset 312 is configured particularly for the cylinder port 206 in which it is located.

Figure 4:
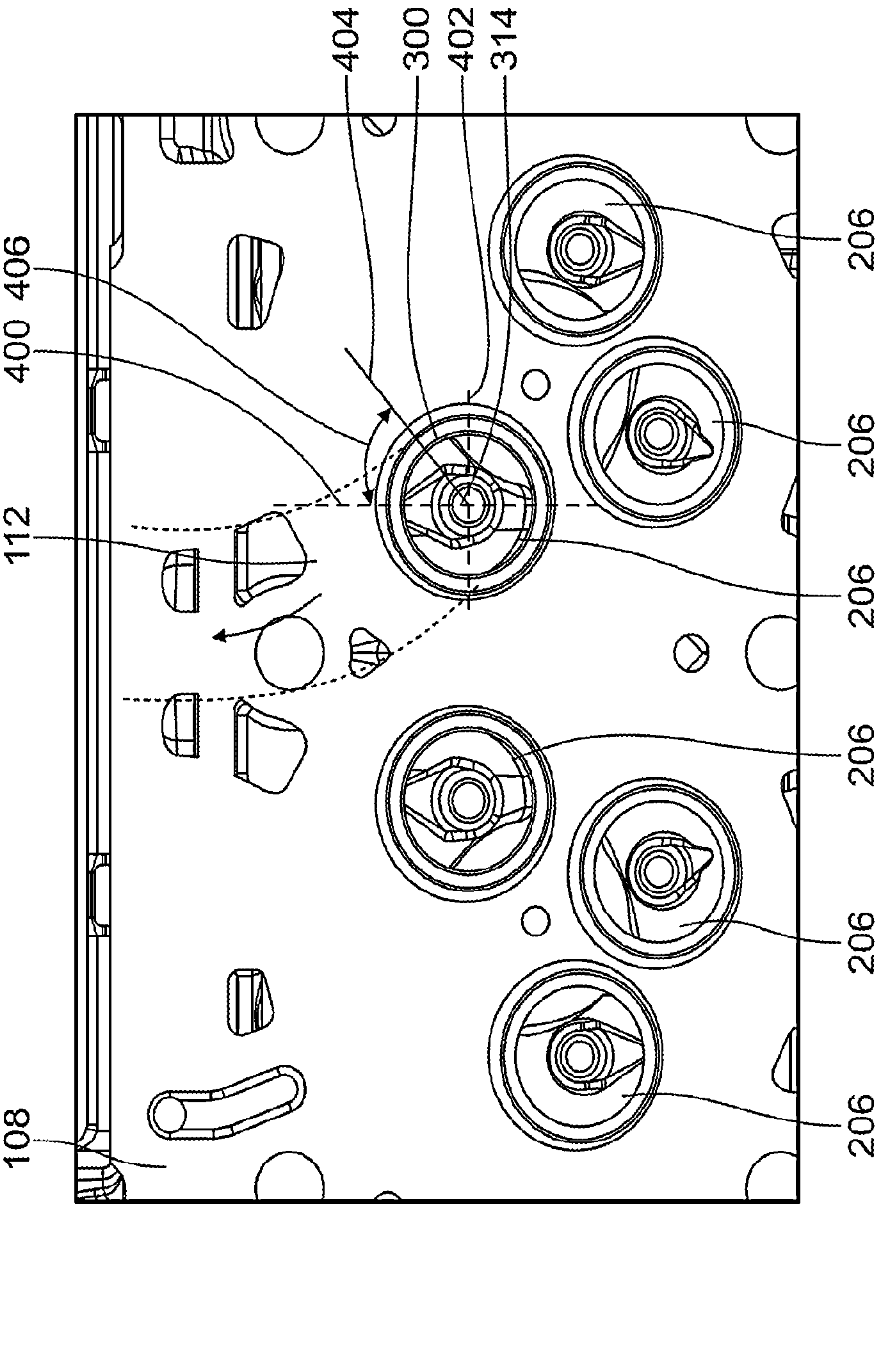
FIG. 4 is a bottom view of a cylinder head with a plurality of cylinder ports, according to an exemplary embodiment.

FIG. 4 is a bottom view of a cylinder head 108 with a plurality of cylinder ports 206, according to an exemplary embodiment. The cylinder head 108 may include any number of cylinder ports 206. The cylinder ports 206 may be intake ports (e.g., ports through which intake gases enter the cylinder) or exhaust ports (e.g., ports through exhaust gases exit the cylinder). The configuration of the cylinder ports 206 on the cylinder head 108 corresponds to the type and needs of the engine 100. For example, the cylinder head 208 may include one exhaust port and one intake port per cylinder. As another example, the cylinder head 208 may include two exhaust ports and two intake ports per cylinder. The cylinder ports 206 may each include a separate channel 112, or two or more cylinder ports 206 may fluidly couple to the same channel 112. FIG. 4 depict a channel 112 which directs exhaust gas from a cylinder via the cylinder port 206. The cylinder port 206 defines a primary axis 400 and a secondary axis 402. The primary axis 400 is defined as going through the chamfer axis 314 and as parallel to a reference axis of the cylinder head 108. For example, a reference axis of the cylinder head 108 may be the length or width of the cylinder head 108. The secondary axis 402 is perpendicular from the primary axis 400 and also goes through the chamfer axis 314. The chamfered portion 300 defines an offset direction 404. The offset direction 404 is the direction in which the offset 312 is at its maximum relative to the channel central axis 310. The chamfered portion 300 is offset away from the channel 112 and further defines an offset angle 406, measured as the minor arc between the primary axis 400 and the offset direction 404. The offset angle 406 may be any angle (1 degrees, 2 degrees, 5 degrees, 10 degrees, 15 degrees, 30 degrees, 45 degrees, 60 degrees, 75 degrees, 90 degrees, 120 degrees, etc.). In some embodiments, the offset angle 406 is approximately 45 degrees when the primary axis 400 is parallel to the width of the cylinder head 108.

The chamfered portion 300, with the offset 312 and the offset angle 406, directs the flow around the valve 110 such that the forces pushing the valve stem 202 into the valve guide bores 114 are minimized, thus reducing the wear on the valve guide bores 114. In some embodiments, the shape (e.g., the chamfered portion 300, the offset 312, and the offset angle 406) of each cylinder port 206 of the cylinder head 108 is configured specifically for the corresponding cylinder port 206, so that the wear on the valve guide bore 114 corresponding to the cylinder port 206 is minimized. For example, a first cylinder port may define a first shape and a second cylinder port may define a second shape, with the first shape being different than the second shape.

Figure 5:
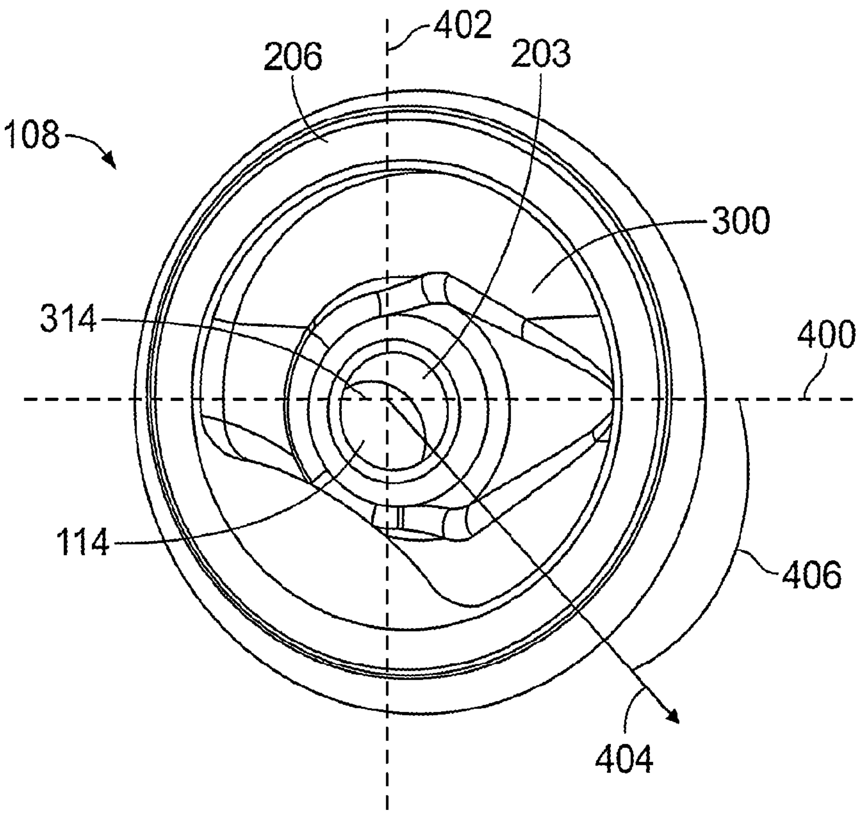
FIG. 5 is a close-up bottom view of one of the cylinder ports of the cylinder head of FIG. 4.

FIG. 5 is a close-up bottom view of one of the cylinder ports 206 of the cylinder head 108 of FIG. 4. The cylinder port 206 includes the chamfered portion 300 defining the offset 312 at an offset angle 406. As seen in FIG. 5, the chamfer axis 314 is co-axial to a central axis (e.g., a valve guide bore axis) defined by the valve guide bore 114. This alignment ensures that the valve 110 aligns with the cylinder port 206.

The cylinder port 206 may be manufactured (e.g., cast, assembled, etc.) together with and, thus formed within, the cylinder head 108, or may be created during a processing step (e.g., milling, cutting, etc.). In some embodiments, a machine (e.g., mill, lathe, drill, etc.), such as a computer numerical control machine, is used to remove portion of the cylinder head 108 to form the chamfered portion 300. In some embodiments, the chamfered portion 300 may be a separate component that is fixedly coupled (e.g., adhered, welded, bolted, etc.) to the cylinder head 108. In some embodiments, the cylinder port 206 may include additional features to direct flow. The additional features may have a similar purpose to the chamfered portion (e.g., directing flow around the valve 110), or may be configured for other purposes such as reducing vortex formation, reducing weight, providing a structural support, or the like.

While this specification contains many specific implementation details, these should not be construed as limitations on the scope of what may be claimed but rather as descriptions of features specific to particular implementations. Certain features described in this specification in context of separate implementations can also be implemented in combination in a single implementation. Conversely, various features described in the context of a single implementation can also be implemented in multiple implementations separately or in any suitable subcombination. Moreover, although features may be described as acting in certain combination and even initially claimed as such, one or more features from a claimed combination can, in some cases, be excised from the combination, and the claimed combination may be directed to a subcombination or variation of a subcombination.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some or all of the elements in the list. Conjunctive language such as the phrase "at least one of X, Y, or Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangement, use of materials, colors, orientations, etc.) without materially departing from the novel teachings and advantages of the subject matter described herein. For example, elements shown as integrally formed may be constructed of multiple components of elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present disclosure.

The invention claimed is:

1. An engine system comprising:

a cylinder block defining a plurality of cylinders; and a cylinder head assembly comprising:

a cylinder head;

a plurality of channels defined within the cylinder head, the plurality of channels fluidly coupled to the plurality of cylinders via a plurality of cylinder ports, wherein each of the plurality of cylinder ports comprises:

a chamfered portion, the chamfered portion offset away from a respective channel of the plurality of channels and defining a central chamfer axis and an offset angle, the central chamfer axis defined as an axis that is equidistant to each point along an edge of the chamfered portion, the offset angle measured as a minor arc between a primary axis of the cylinder port and an offset direction; and a plurality of valves, each of the plurality of valves selectively coupled to a respective cylinder port of the plurality of cylinder ports, the chamfered portion of each of the plurality of cylinder ports configured to accept a respective valve head of the plurality of valves, the central chamfer axis of each of the chamfered portions corresponding to an axis along which a respective valve of the plurality of valves operates.

2. The engine system of claim 1, further comprising an exhaust system fluidly coupled to the plurality of channels.

3. The engine system of claim 1, wherein each valve of the plurality of valves comprises:

a valve stem; and the valve head, wherein the valve head is contiguous with the valve stem.

4. The engine system of claim 1, wherein the chamfered portion corresponds to the shape of a valve head of the valve associated with a respective cylinder port of the plurality of cylinder ports.

5. The engine system of claim 4, wherein each of the plurality of valves forms a seal with the chamfered portion associated with a respective cylinder port of the plurality of cylinder ports.

6. The engine system of claim 1, wherein the central chamfer axis is offset from a corresponding channel of the plurality of channels by the offset angle.

7. The engine system of claim 1, wherein the chamfered portion of a first cylinder port of the plurality of cylinder ports defines a first shape, and a second cylinder port of the plurality of cylinder ports defines a second shape, wherein the first shape is different than the second shape.

8. A cylinder head assembly of an engine, the cylinder head assembly comprising:

a cylinder head;

a plurality of channels defined within the cylinder head; and a plurality of cylinder ports fluidly coupled to the plurality of channels, each of the plurality of cylinder ports comprising a chamfered portion offset away from a respective channel of the plurality of channels, the chamfered portion defining a central chamfer axis and an offset angle, the central chamfer axis defined as an axis that is equidistant to each point along an edge of the chamfered portion, the offset angle measured as a minor arc between a primary axis of the cylinder port and an offset direction, the chamfered portion configured to accept a valve head, the central chamfer axis corresponding to an axis along which a valve operates.

9. The cylinder head assembly of claim 8, further defining a plurality of valve guide bores, wherein each of the plurality of valve guide bores defines a guide bore axis.

10. The cylinder head assembly of claim 9, wherein a central chamfer axis defined by each of the chamfered portions is co-axial to the guide bore axis of a respective valve guide bore of the plurality of valve guide bores.

11. The cylinder head assembly of claim 10, wherein the central chamfer axis is offset from a central channel axis by an offset distance, the central channel axis defined by a respective channel of the plurality of channels.

12. The cylinder head assembly of claim 11, wherein the offset distance is approximately 1.3 millimeters.

13. The cylinder head assembly of claim 10, wherein the central chamfer axis is offset from a respective channel of the plurality of channels by the offset angle.

14. The cylinder head assembly of claim 13, wherein the offset angle is approximately 45 degrees.

15. The cylinder head assembly of claim 8, wherein a height of the chamfered portion increases from a minimum height to a maximum height along the edges of the chamfered portion.

16. The cylinder head assembly of claim 15, wherein the chamfered portion protrudes away from a central channel axis of a respective channel of the plurality of channels, the chamfered portion protruding farther away from the central channel axis at the maximum height than at the minimum height.

17. The cylinder head assembly of claim 8, wherein the chamfered portion tapers along a height from a first width to a second width.

18. The cylinder head assembly of claim 17, wherein the second width is greater than the first width.

19. The cylinder head assembly of claim 8, wherein the plurality of cylinder ports are formed within the cylinder head.

* * * * *